United States Patent [19]

Peterson et al.

[11] Patent Number: 5,147,147
[45] Date of Patent: Sep. 15, 1992

[54] METHOD FOR THE REMOVAL OF AQUEOUS LIQUIDS FROM THE SUMP OF AN UNDERGROUND CAVITY

[75] Inventors: Harald Peterson; Jurgen Martens; Werner Harms; Uwe Kramer, all of Oldenburg, Fed. Rep. of Germany

[73] Assignee: Energieversorgung Weser-Ems AG, Oldenburg, Fed. Rep. of Germany

[21] Appl. No.: 571,755

[22] Filed: Aug. 22, 1990

[30] Foreign Application Priority Data

Aug. 24, 1989 [DE] Fed. Rep. of Germany ....... 3927906

[51] Int. Cl.5 ................................................ B65G 5/00
[52] U.S. Cl. ......................................... 405/59; 405/53
[58] Field of Search ...................... 405/58, 59, 52, 55, 405/56, 57; 166/261, 503.1

[56] References Cited

U.S. PATENT DOCUMENTS

| | | | |
|---|---|---|---|
| 2,851,105 | 9/1958 | Garst | 166/305.1 |
| 2,874,779 | 2/1959 | Johnson | 166/305.1 |
| 3,275,078 | 9/1966 | Rieber | 166/305 D |
| 3,329,206 | 7/1967 | Van Poollen | 166/305 DX |
| 4,618,282 | 10/1986 | Gloria et al. | 405/59 X |
| 4,626,131 | 12/1986 | Glew et al. | 405/59 |
| 4,701,072 | 10/1987 | Berezoutzky | 405/59 X |

FOREIGN PATENT DOCUMENTS 1040181 8/1966 United Kingdom .................. 405/59

OTHER PUBLICATIONS

5 Ways to recover stored LPG The Oil and Gas Journel, Apr. 10, 1961.

Primary Examiner—Dennis L. Taylor
Attorney, Agent, or Firm—Collard & Roe

[57] ABSTRACT

A method for the removal of water or aqueous liquids from the sump of an underground cavity, especially a cavern, is based on providing a process in which a water-miscible organic liquid is added to the sump, and then the mixture formed in this way is extracted from the cavity.

6 Claims, 4 Drawing Sheets

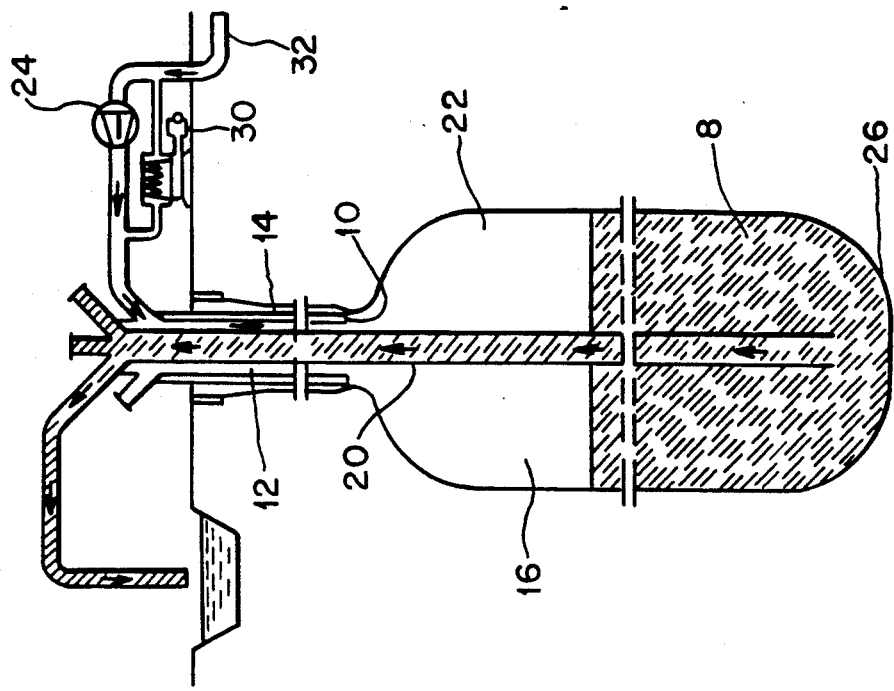
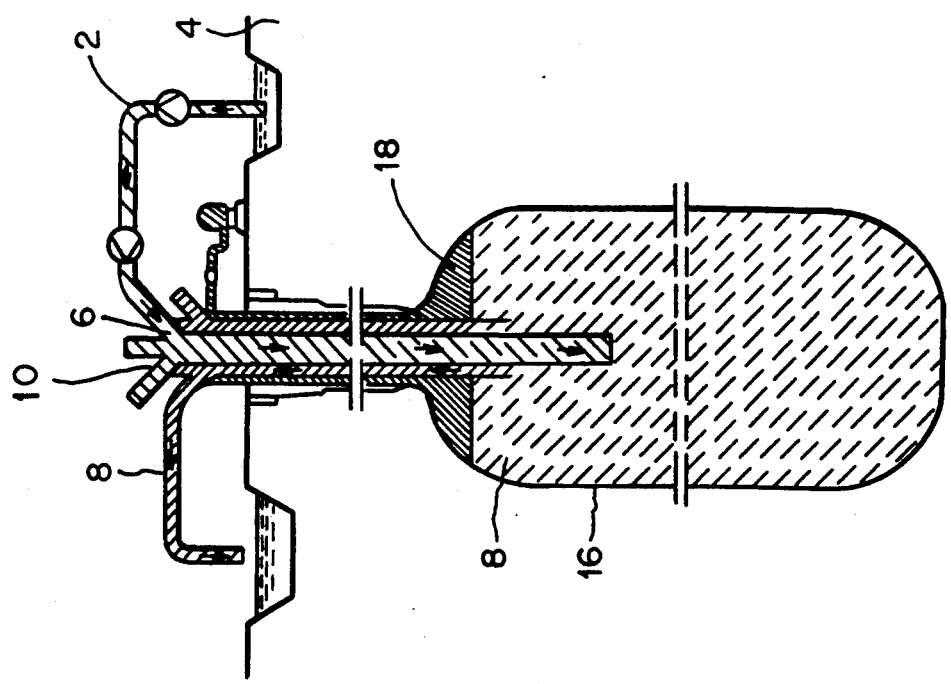

METHOD FOR THE REMOVAL OF AQUEOUS LIQUIDS FROM THE SUMP OF AN UNDERGROUND CAVITY

BACKGROUND OF THE INVENTION

1. Field of the Invention

The invention relates to a method for the removal of water and aqueous liquids from the sump of an underground cavity, especially a cavern.

2. The Prior Art

Underground cavities, e.g. caverns located in salt domes, can be used for storage of large amounts of gases, liquids and other substances to be stored Caverns are produced in a salt dome by solution mining. For this, fresh water is continuously sent into the salt dome, under pressure, through a bore hole, with the desired cavity forming as the salts dissolve and the resulting brine is flushed out. In order to be able to utilize the cavern volume formed by solution mining for storage, the brine is removed from the cavern after solution mining has been stopped. With the method used for creating a gas cavern, a sump remains at the bottom of the cavern the first time the cavern is filled with gas. This sump essentially consists of the aqueous salt solution, and its surface and volume are essentially determined by the geometric dimensions of the cavern and the installation depth of the brine removal equipment.

When placing a gaseous medium, e.g. natural gas, in storage, the gas comes into contact with the free surface of the sump and absorbs water, i.e. water vapor. During subsequent removal of the gas from storage, hydrate formation can occur in a bore hole or subsequent gas distribution network, as a result of the water or water vapor content of the gas. In order to prevent this, the removal rate has to be reduced, in order to prevent cooling, which occurs due to the Joule-Thomson effect based upon adiabatic expansion of the gas, to such an extent that the temperature does not drop below the water vapor dew point. This is undesirable, since the stored gas is particularly needed to cover peak demand over short periods of time with high consumption rates. In any case, the gas taken from storage in caverns must be dried, in a complicated technical process, before being introduced into the gas distribution network which serves to transport the gas to the consumers.

Furthermore, the quality of the stored gas can be detrimentally affected by the moisture absorbed. For example, the occurrence of an increased hydrogen sulfide content in natural gas after being removed from caverns is attributable to the hydrolysis of carbonyl sulfide which occurs in many types of natural gas.

In order to reduce the expenditure for such drying processes, it has already been attempted to prevent absorption of water or water vapor by the gaseous medium, e.g. natural gas, stored in the cavern, by covering the sump in the cavern with a material which inhibits or, if possible, completely prevents material transport of water from the sump into the stored gas.

A disadvantage of the use of cover layers in the solid aggregate state is that because of the lack of self-sealing properties, the blockage effect is eliminated by crack formation or destruction, for example if chunks of stone or salt come loose from the walls of the cavern or cavity and fall onto it.

Liquid or plastic cover layers do demonstrate self-sealing properties, but these are not suitable for preventing thermodynamic equilibrium from occurring in a subterranean cavity. Such cover layers can slow the diffusion of water from the sump into the medium stored in the cavity, but cannot prevent it completely.

SUMMARY OF THE INVENTION

It is an object of the present invention to provide a method by which water or aqueous liquids can be removed from the sump of a subterranean cavity.

This object is accomplished in accordance with the present invention, by providing a method for the removal of water or an aqueous liquid from a sump in an underground cavity comprising adding a water-miscible organic liquid to the sump to form a mixture in the cavity; and extracting the mixture from the cavity.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawings, wherein similar reference characters denote similar elements throughout the several views:

FIG. 1 is a section view of the leaching process zone of the prior art method;

FIG. 2 is a section view of the gas injection zone of the prior art method;

DETAILED DESCRIPTION OF PREFERRED EMBODIMENT

Figure 4:
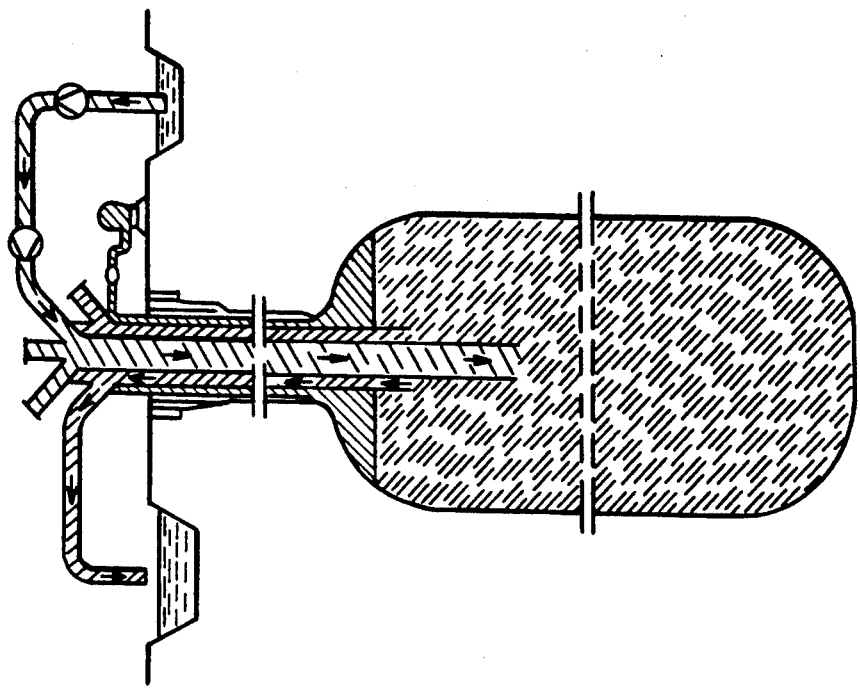
FIG. 4 is a section view of the leaching process zone of the method according to the present invention.

Turning now in detail to the drawings, they show the building and operating of a storage facility according to the present invention in comparison with the prior art existing method.

DESCRIPTION OF THE EXISTING PRIOR ART METHOD

Step 1. Leaching. After drilling and completing, the leaching process is begun (FIG. 1). Fresh river water 2 is pumped into the salt dome 4 through the inner casing 6. Simultaneously, the salt-saturated brine 8 is driven out through the annular space 10 between the inner casing 12 and the outer casing 14. In order to avoid leaching of the ceiling of underground cavity 16, a protective fluid 18 is injected, which floats on the brine and preserves the salt above.

Figure 3:
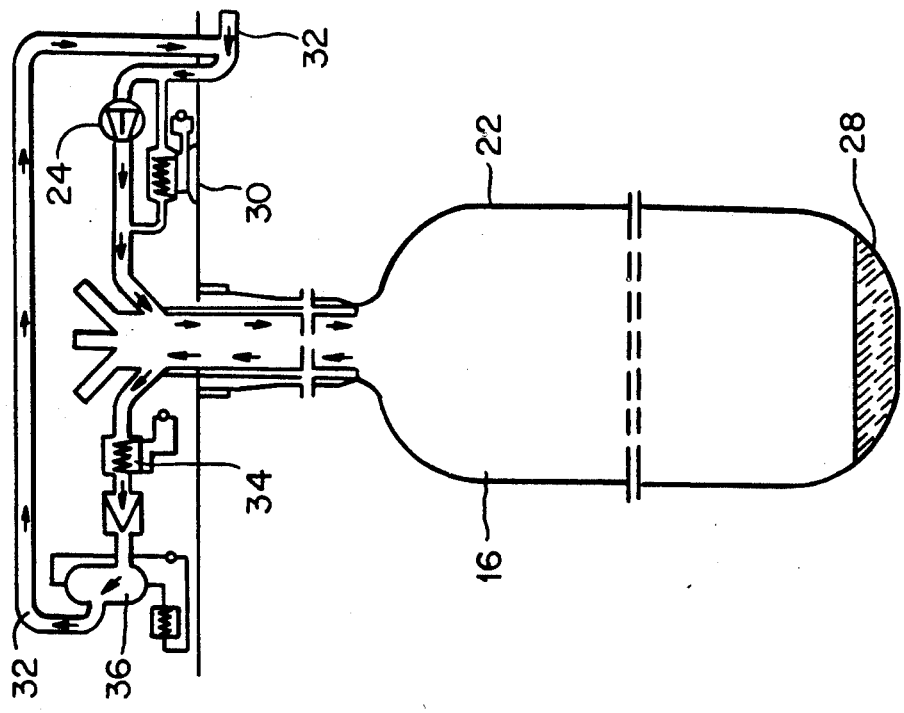
FIG. 3 is a section view of the sump containing storage operations zone of the prior art method.

Step 2. Initial Gas Supply. After the cavity 16 is created, an inner tubing 20 is introduced for removal of remaining brine 8. This brine is then displaced by dry natural gas 22, or by gas with a very small amount of water, injected by injection compressor 24 into the cavity through the annular space 10 between the inner casing 12 and the outer casing 14 (FIG. 2). Because the bottom 26 of the cavity 16 cannot be made smooth, and because the inner tubing 20 cannot be set as deeply as possible without it becoming clogged with salt, etc., a residual volume of salt-saturated brine remains as a sump 28 (FIG. 3). In a typical cavity the sump may be located 1,500 m below the surface.

Step 3. Storage Operations. After this initial supply, the cavity 16 is ready for continuous storage operations (FIG. 3). In the injection phase, so long as cavity pressure remains below pipeline pressure, the natural gas 22 is preheated by preheater 30. As gas pressures initially are being dropped to lower levels, this preheating averts the freezing of instruments, and also averts the possibility of hydrate formation. When the cavity 16 attains a pressure equal to that of the pipeline 32, the compressor 24 is necessary to continue the injection procedure.

In the withdrawal phase, the gas 22 is again heated by heater 34 as gas pressures are dropped in going from the cavity 16 to the pipeline 32. The gas 22 is then dried in a known complicated procedure using a dehydrator 36, to ensure that no water enters the pipeline grid.

DESCRIPTION OF THE NEW METHOD ACCORDING TO THE PRESENT INVENTION

Step 1. Leaching. Same as step 1 in Existing Method, as shown in FIG. 1 and FIG. 4.

Figure 5:
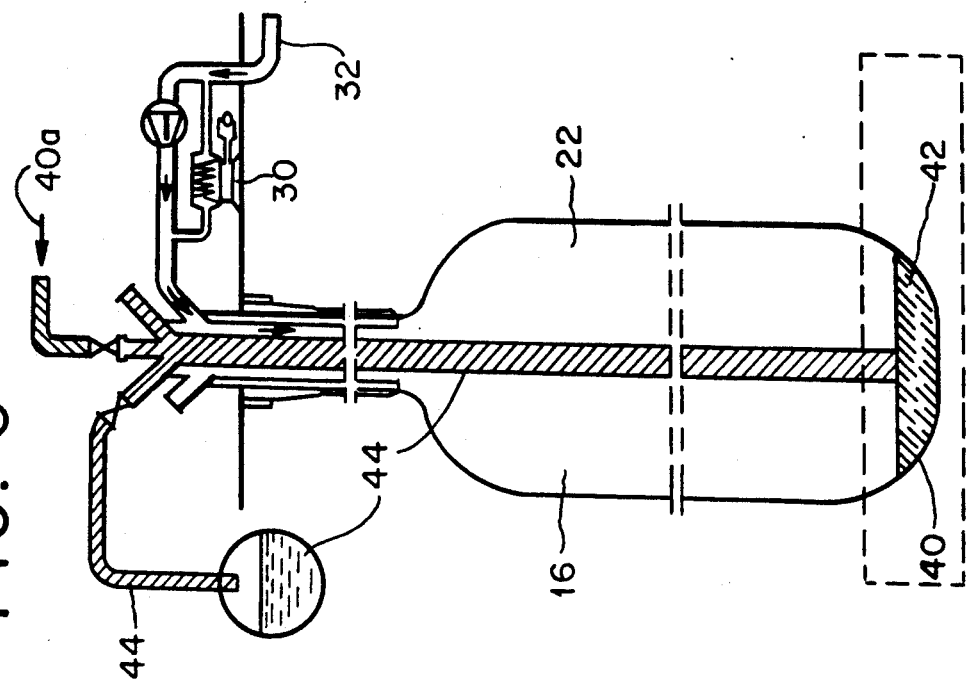
FIG. 5 is a section view of the gas injection zone of the method according to the present invention.

Step 2. Initial Gas Supply. Same as step 2 in Existing Method, as shown in FIG. 2 and FIG. 5.

Figure 6:
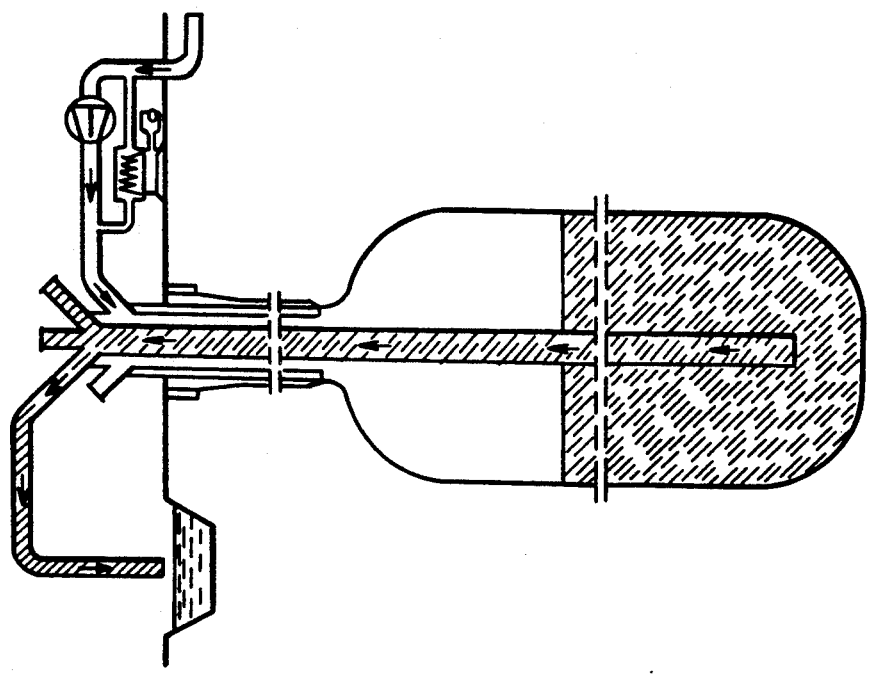
FIG. 6 is a section view of the sump removal zone of the method according to the present invention.
Figure 8:
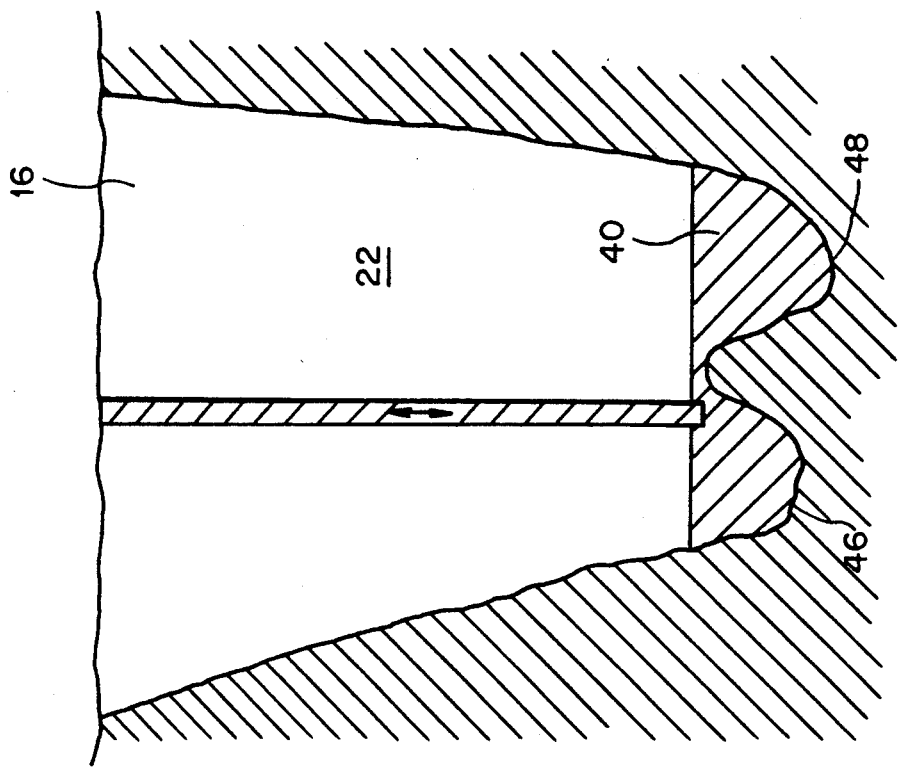
FIG. 8 is a section view of an enlarged detail picture of the bottom of cavity, as shown in FIG. 6.

Step 3. Removal of Sump. A water-miscible organic liquid 40 (such as an alcohol 40a) is introduced into the sump 42 (as shown in FIG. 6), causing it to mix with the salt-saturated brine 28 (FIG. 3) to form a homogeneous phase mixture 44. A part of this mixture 44 is displaced by dry gas 22 or by gas with a very low water content, compressed into the cavity 16. The alcohol 40a is then extracted from the mixture, by a conventional method (not shown) such as distillation, and is reintroduced into the cavity for repeated or continuous removal operations. The removal process is completed when the sump of salt-saturated brine has been replaced entirely with the water-miscible organic liquid 40, as shown in FIGS. 6 and 8.

Figure 7:
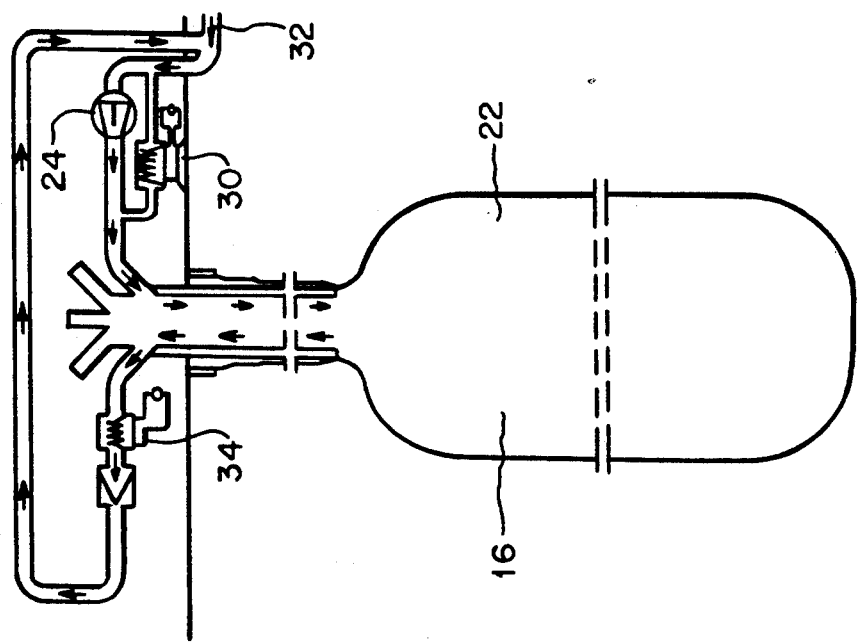
FIG. 7 is a section view of the sump free storage operations zone of the method according to the present invention.

Step 4. Storage Operations. Similar to step 3 shown in FIG. 3 of the Existing Method, except for the stored dry gas, which has come into contact (as shown in FIG. 6) with only a sump of a water-free anhydrous entirely organic liquid (alcohol), so that it does not require drying when it is removed from storage. If a low boiling alcohol 40a, for example, methanol, is used in FIG. 6, after a short period of time the alcohol is evaporated and transferred to the gas phase. As a result, the cavity 16 is entirely free of any liquid, as shown in FIG. 7. Operations continue without the prior art complicated drying process of FIG. 3, resulting in higher production rates per hour. As shown in FIG. 8, without the process of the present invention, the pipe mouth cannot reach the deepest point, or points 46 or 48 of the cavity 16, and the sump 40 remains.

By adding a water-miscible organic liquid, the free surface of the sump (the so-called surface) in the cavity increases to such an extent, that removal of the sump liquid (for example by displacement with gas) becomes possible again. The residue of water or aqueous liquids remaining in the cavern is therefore diluted with the organic, water-miscible liquid. With constant dilution and removal of the mixture, the water content in underground cavities can therefore be reduced as much as desired.

The process can be carried out batchwise, by first adding the water-miscible organic liquid, and then removing the resulting mixture. This addition and subsequent removal can be repeated several times, until the desired extraction of water from the cavern has been accomplished.

The process according to the invention can also be carried out continuously, however, by removing the resulting mixture simultaneously while the water-miscible organic liquid is being added. For example, towards the end of the gas filled caverns for the first time, where the brine is being displaced via a brine removal equipment installed at just above the bottom of the cavern, the water-miscible organic liquid can be continuously added. For example, the liquid may be added by direct introduction into the cavity, and the mixture can be withdrawn. However, the brine removal equipment can also be used for adding the organic liquid. By sending gas in under pressure again, the mixture can be extracted as often as desired.

According to a preferred embodiment of the invention, the water is removed from the extracted mixture, to produce a purified liquid; and this purified liquid portion of the extracted mixture is recycled to the sump, i.e. to the mixture remaining in the sump. The extracted mixture, charged with water, can be freed from the water by using conventional methods, e.g. by distillation, and made usable again. More and more water is extracted from the sump with repeated or continuous addition and removal. Finally, the water in the sump is completely replaced with the water-miscible organic liquid. The stored gas which comes into contact with the surface of the sump, which contains only organic liquid, not water, no longer requires drying with complicated drying procedures when it is taken from storage.

Possible water-miscible organic liquids are particularly those liquids which contain one or more hydroxyl groups, especially alcohols. Monohydroxy or polyhydroxy alcohols can be used, and mixtures of alcohols are also suitable. Ethylene glycol, diethylene glycol, triethylene glycol, pentaethylene glycol, as well as higher liquid polyethylene glycols, with a molecular weight range between 200 and 600 dalton, glycerin and methanol as well as their mixtures are preferred.

Among the polyhydroxy alcohols, diethylene glycol, triethylene glycol and glycerin, as well as mixtures of them in any ratio, are especially preferred.

Preferred monohydroxy alcohols are alkanols of 1 to 6 carbon atoms such as methanol, ethanol and isopropanol.

When using such monohydroxy alcohols, another advantage is that after complete replacement of the water in the sump with the alcohol in question, the latter is completely removed from the cavity within a short period of time, as the stored gas is removed from storage, because of the alcohol's transition to the gas phase. This results in a completely dry subterranean cavity, free of any liquid, which is of particular technical interest for the storage of special waste.

The monohydroxy alcohol which evaporates into the gas phase little by little increases the volume of gas that can be sold. Furthermore, the geometric cavern volume which can be used for gas storage is increased by reducing the liquid sump volume.

In addition, the use of a monohydroxy alcohol such as methanol has the advantage that its gas phase is contained in the gas removed from storage. This thereby changes the dew point of the gas in such a way that icing and hydrate formation in pipelines and fittings in the storage plant and in the subsequent gas distribution network is prevented when the gas is expanded.

Use of the method according to the invention is not limited to caverns in salt domes, but rather it can be used in any subterranean cavities without openings which possess an aqueous sump.

While only a single embodiment of the present invention has been shown and described, it is to be understood that many changes and modifications may be made thereunto without departing from the spirit and scope of the invention as defined in the appended claims.

What is claimed is:

1. A method for the removal of water or an aqueous liquid from a sump for use to store a gas in an underground cavity comprising:
    adding a water-miscible organic liquid to the sump to form a mixture in the cavity while avoiding the formation of liquid layers;
    extracting said mixture from the cavity, by removing the mixture upwardly only;
    continuing the adding of the water-miscible organic liquid, and extraction of the resulting mixture, which occur at the same time, until the sump consists essentially of said organic liquid;
    selecting said water-miscible organic liquid from the group consisting of a monohydroxy alcohol, a mixture of monohydroxy alcohols, a polyhydroxy alcohol, a mixture of polyhydroxy alcohols, and a mixture of monohydroxy and polyhydroxy alcohols.

2. A method according to claim 1, comprising first adding the water-miscible organic liquid and then extracting the resulting mixture.

3. A method according to claim 2, comprising having the adding step and subsequent extracting step repeated several times.

4. A method according to claim 1, comprising removing the water from the extracted mixture, to produce a purified liquid, and recycling the purified liquid portion of the extracted mixture to the sump.

5. A method for the removal of water or an aqueous liquid from a sump in an underground cavity to produce an anhydrous dry gas storage cavity comprising:
    adding a water-miscible organic liquid to the sump to form a mixture in the cavity;
    extracting said mixture from the cavity; said extracting of said mixture being by sending dry gas into said cavity under pressure so that the mixture can be moved upwardly and out of the cavity; removing the water from the extracted mixture outside of the cavity to produce a purified water-miscible organic liquid portion free from water previously contained therein;
    recycling this purified organic liquid portion down into the sump mixture remaining in the cavity;
    extracting more water from the sump with repeated or continuous addition and removal, until finally the water in the sump is completely replaced with an anhydrous water-miscible organic liquid;
    whereby the gas which comes into contact with the surface of the sump, which contains only said anhydrous organic liquid, no longer requires drying when said gas is taken from storage in said cavity.

6. A method for the removal of water or an aqueous liquid from a sump in an underground cavity comprising:
    adding a water-miscible organic liquid to the sump to form a mixture in the cavity while avoiding the formation of liquid layers;
    extracting said mixture from the cavity, by removing the mixture upwardly only;
    continuing the adding of the water-miscible organic liquid, and extraction of the resulting mixture until the sump consists essentially of said organic liquid;
    selecting said water-miscible organic liquid from the group consisting of a monohydroxy alcohol, a mixture of monohydroxy alcohols, a polyhydroxy alcohol, a mixture of polyhydroxy alcohols, and a mixture of monohydroxy and polyhydroxy alcohols.

* * * * *